United States Patent [19]

Baguelin

[11] 4,104,993
[45] Aug. 8, 1978

[54] ENGINE COOLING SYSTEMS

[75] Inventor: Yves Baguelin, Louveciennes, France

[73] Assignee: Societe Anonyme de Vehicules Industriels et d'Equipements Mecaniques Saviem, France

[21] Appl. No.: 734,379

[22] Filed: Oct. 21, 1976

[30] Foreign Application Priority Data

Oct. 30, 1975 [FR] France .................... 75 33214

[51] Int. Cl.² .................... F01P 7/10; F01N 3/02; F01P 11/10; F28F 9/22
[52] U.S. Cl. .................... 123/41.49; 60/317; 60/320; 123/41.31; 123/41.65; 165/124
[58] Field of Search ............... 123/41.31, 41.48, 41.49, 123/41.57, 41.65, 41.66; 60/320, 321, 315, 317; 165/51, 124

[56] References Cited

U.S. PATENT DOCUMENTS

| 1,750,590 | 3/1930 | Guernsey | 123/41.31 |
| 2,228,637 | 1/1941 | Mercier | 123/41.31 |
| 2,583,651 | 1/1952 | Horning, Jr. | 123/41.65 |
| 3,413,804 | 12/1968 | Schongs et al. | 60/317 |

FOREIGN PATENT DOCUMENTS

| 1,321,469 | 12/1963 | France | 123/41.65 |
| 2,269,636 | 4/1974 | France | 165/51 |

Primary Examiner—Charles J. Myhre
Assistant Examiner—Sheldon Richter
Attorney, Agent, or Firm—Buckman and Archer

[57] ABSTRACT

An engine cooling system comprises a radiator through which a cooling air flow is induced by means of a fan. The cooling air flow is divided into a main stream and an auxiliary stream. Gases to be cooled, for example the exhaust gases of the engine, are mixed with the auxiliary air stream and are discharged via an outlet duct.

1 Claim, 1 Drawing Figure

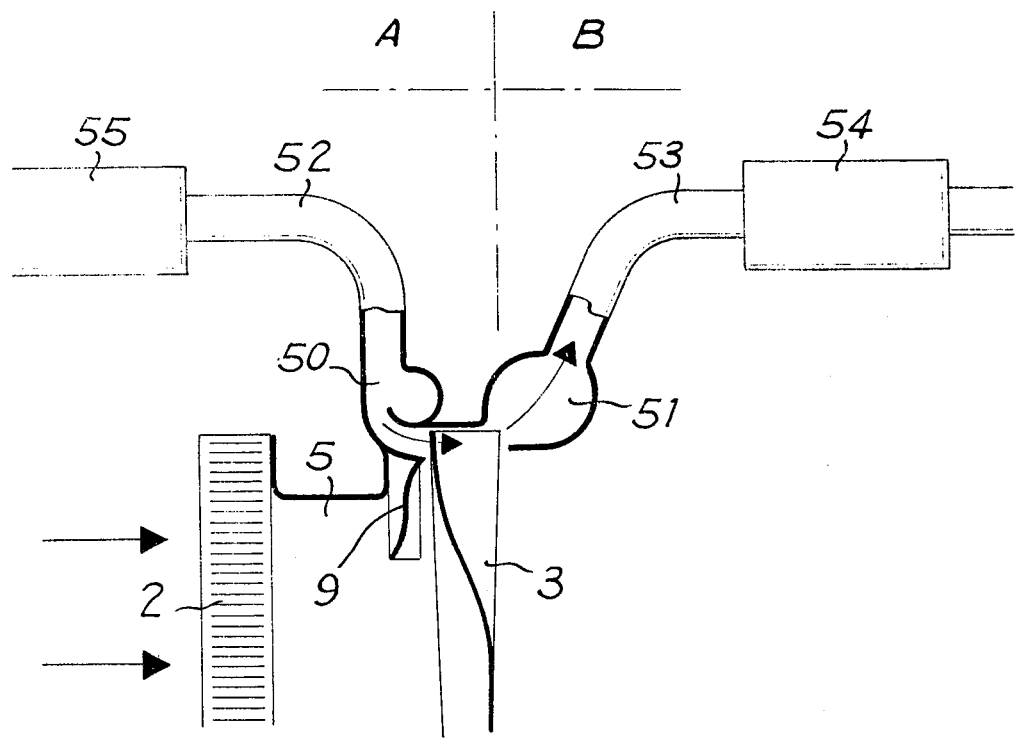

ENGINE COOLING SYSTEMS

BACKGROUND OF THE INVENTION

1. Field of the Invention

The present invention relates to engine cooling systems.

2. Description of the Prior Art

French Patent Specification No. 74 13 573 published under No. 2,269,636 relates to an engine cooling system having a main radiator through which air is drawn by a fan. A connecting tube is disposed between the radiator and the fan, and at the level of the fan and the connection tube, the cooling air is divided into two separate streams, namely a main central stream and an auxiliary induced peripheral stream which enters a volute disposed adjacent the tips of the blades of the fan.

This peripheral induced air stream is used for various purposes in the cooling process.

SUMMARY OF THE INVENTION

According to the present invention, there is provided in an engine cooling system, a radiator, fan means inducing an air flow through the radiator, connecting tube means located between the radiator and the fan means, means forming said air flow into a main central stream and an auxiliary peripheral stream, means feeding a gas to be cooled directly into said auxiliary stream to be mixed therewith to form a gas mixture, and means defining an outlet duct for said mixture.

The gas to be cooled may be the exhaust gases of the engine, these gases issuing from the exhaust manifold and being injected upstream and on the periphery of the fan in an appropriate volute.

At the level of the fan and of the connecting tube, provision is advantageously made for two separate axial flows, one of which is constituted by the auxiliary cooling air stream, the other by the exhaust gases arriving axially at the periphery of the fan.

This arrangement permits a reduction of the pressure drop of the gases at the outlet of the exhaust manifold to be obtained. Moreover, it makes it possible to obtain a contraction of the exhaust gases by cooling and a raising of the frequency level of the exhaust gas noise, which facilitates attenuation of the exhaust noise level.

BRIEF DESCRIPTION OF THE DRAWINGS

An embodiment of the invention will now be described by way of example only, with reference to the accompanying diagrammatic drawing the sole figure of which is a schematic section of a system for cooling the exhaust gases of an internal combustion engine.

DESCRIPTION OF THE PREFERRED EMBODIMENT

There is shown in the drawing a radiator 2 of an engine cooling system through which an air flow is drawn by means of a fan 3. Between the radiator 2 and the fan 3 a tube or nozzle 5 is disposed, the periphery of which leads to an inlet volute 50 and an outlet volute 51 located adjacent the tips of the blades of the fan 3.

On the internal face of the nozzle 5, fixed axial and directing vanes 9 are mounted. The vanes impart a preliminary rotation to the axial flow in the direction of rotation of the fan. The inlet volute 50 situated partly upstream of the blades of the fan is connected to a duct 52 which receives engine exhaust gases from an expansion box 55, and the outlet volute 51 situated partly downstream of the blades of the fan is connected with a duct 53 which feeds a mixture of air, derived from an auxiliary peripheral airstream flowing through the radiator 2, and exhaust gases to an expansion box 54 for the gases, or to a silencer.

The central part of the radiator 2 defined by the tube 5 is used in usual manner to form a principal air stream for cooling the liquid in the radiator, while the gas directed into the volute 51 is constituted by exhaust gases coming from the volute 50, with an addition of the heated auxiliary air stream issuing from the radiator.

The mixture of exhaust gases and of the heated air is delivered from the volute 51 into the duct 53, at relatively low temperature.

As is shown in the drawing, there takes place an axial admission of the gases into the zone A, while in zone B a semi-centrifugal delivery is used.

What is claimed is:

1. In an engine cooling system, a radiator, fan means inducing an air flow through the radiator, connecting tube means located between the radiator and the fan means, means forming said air flow into a main central stream and an auxiliary peripheral stream, means feeding a gas to be cooled directly into said auxiliary stream to be mixed therewith to form a gas mixture, means defining an outlet duct for said mixture wherein the gas to be cooled is formed by the exhaust gases of the engine and said fan means comprises blade means having an outer tip, and said feed means comprises means defining an inlet volute adjacent said tip of the blade means and located partly upstream of the blade means, and means defining an exhaust duct feeding the exhaust gases to the inlet volute, said system further comprising means defining an outlet volute adjacent said tip of the blade means and located partly downstream of the blade means, said outlet volute receiving said mixture and feeding said mixture to said outlet duct.

* * * * *